(12) United States Patent
    Zhang et al.

(10) Patent No.: US 11,876,564 B2
(45) Date of Patent: *Jan. 16, 2024

(54) SYSTEM AND METHODS FOR COHERENT BURST RECEPTION

(71) Applicant: CABLE TELEVISION LABORATORIES, INC., Louisville, CO (US)

(72) Inventors: Junwen Zhang, Broomfield, CO (US); Luis Alberto Campos, Superior, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,465

(22) Filed: Feb. 1, 2023

(65) Prior Publication Data

US 2023/0179306 A1 Jun. 8, 2023

Related U.S. Application Data

(63) Continuation of application No. 17/401,473, filed on Aug. 13, 2021, now Pat. No. 11,575,448, which is a continuation of application No. 16/530,838, filed on Aug. 2, 2019, now Pat. No. 11,101,895.

(60) Provisional application No. 62/713,691, filed on Aug. 2, 2018.

(51) Int. Cl.
    *H04B 10/61* (2013.01)
(52) U.S. Cl.
    CPC ............................... *H04B 10/616* (2013.01)

(58) Field of Classification Search
    None
    See application file for complete search history.

(56) References Cited

U.S. PATENT DOCUMENTS

| 11,101,895 B2 | 8/2021 | Zhang |
| 17,896,541 | 8/2022 | Campos |
| 2002/0085804 A1* | 7/2002 | Labrunie ............ H04B 10/2537 385/24 |

(Continued)

FOREIGN PATENT DOCUMENTS

| CN | 103999382 A | 8/2014 |
| CN | 106489245 A | 3/2017 |
| JP | 2014168176 A * | 9/2014 |

*Primary Examiner* — David W Lambert
(74) *Attorney, Agent, or Firm* — Josh C. Snider; Snider IP

(57) ABSTRACT

An optical network communication system utilizes a coherent passive optical network (PON). The system includes an optical line terminal (OLT) having a downstream transmitter and an upstream receiver system configured for time-wavelength division coherent detection. The system further includes a splitter in operable communication with the OLT, and a plurality of optical network units (ONUs) in operable communication with the splitter. Each of the plurality of ONUs is configured to (i) receive downstream coherent burst signals from the OLT, and (ii) transmit at least one upstream burst signal to the OLT. The upstream receiver system further includes a power control module and a local oscillator (LO) configured to generate an optical LO signal The power control module is configured to adaptively control, in real-time, a power level of the optical LO signal.

20 Claims, 10 Drawing Sheets

(56) References Cited

U.S. PATENT DOCUMENTS

2014/0348515 A1 11/2014 Tsubouchi
2015/0365172 A1 12/2015 Luo et al.
2017/0317779 A1* 11/2017 Wu ..................... H04J 14/0252

* cited by examiner

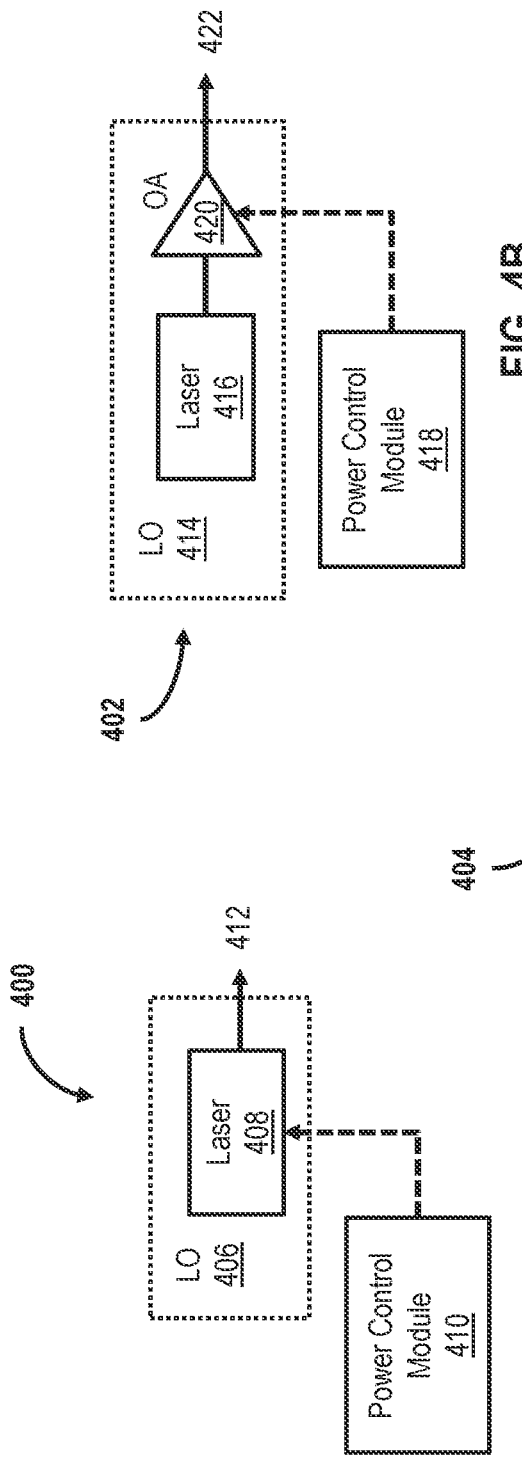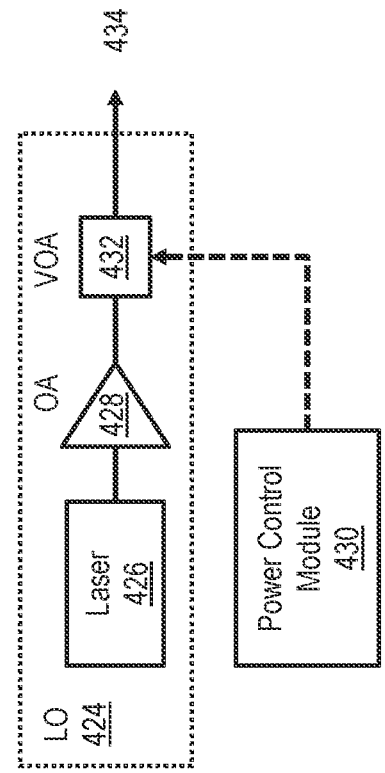

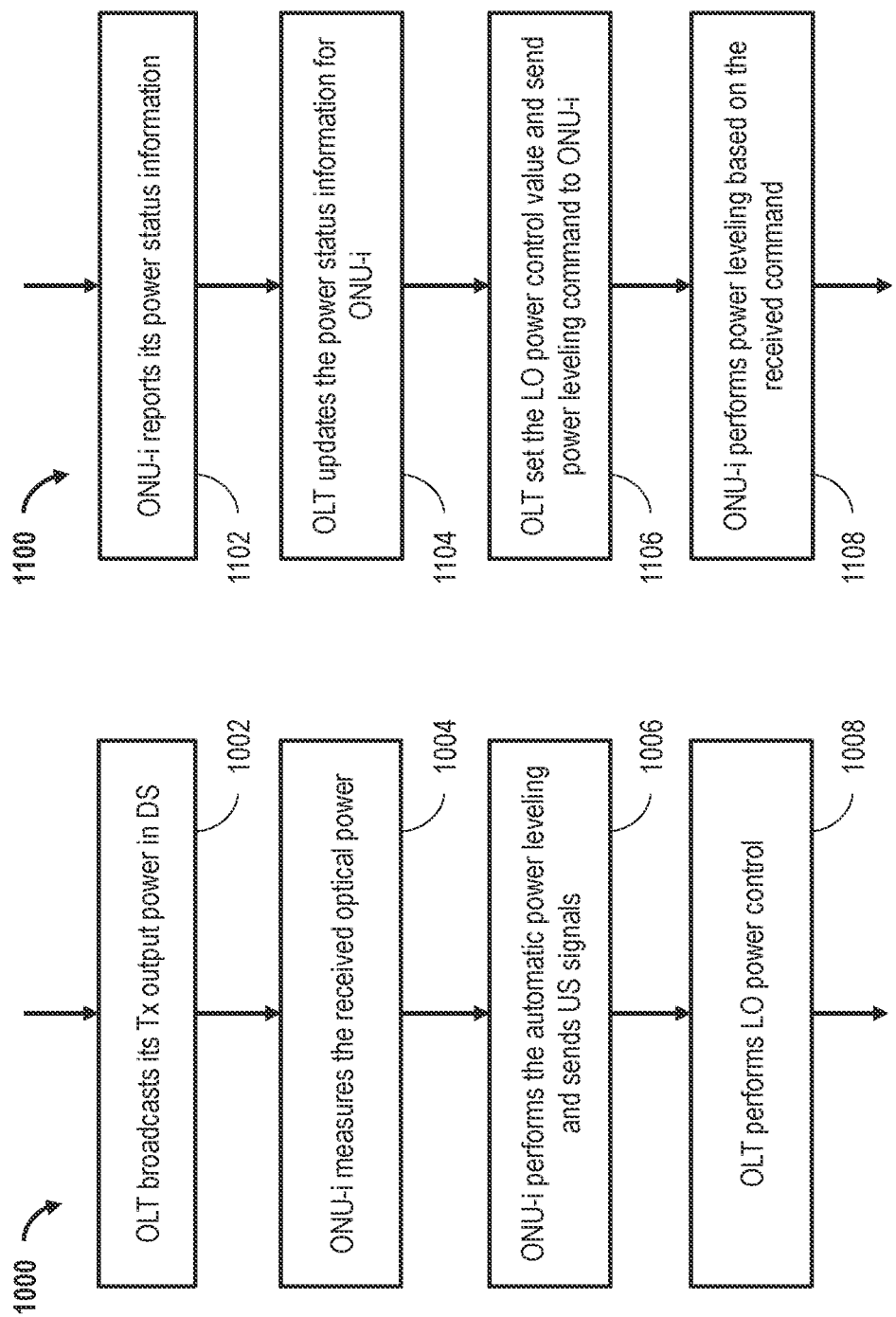

SYSTEM AND METHODS FOR COHERENT BURST RECEPTION

CROSS REFERENCE TO RELATED APPLICATIONS

This application is a continuation of U.S. patent application Ser. No. 17/401,473, filed Aug. 13, 2021. U.S. patent application Ser. No. 17/401,473 is a continuation of U.S. patent application Ser. No. 16/530,838, filed Aug. 2, 2019. U.S. patent application Ser. No. 16/530,838 claims the benefit of and priority to U.S. Provisional Patent Application Ser. No. 62/713,691, filed Aug. 2, 2018. All of these applications are incorporated herein by reference in their entireties.

BACKGROUND

The field of the disclosure relates generally to fiber communication networks, and more particularly, to access networks capable of transmitting coherent optical signals.

The advance of high-speed wired (e.g., fiber-to-the-premise (FTTP)) access networks has been propelled by new business and technology drivers, such as cloud services, 5G wireless transport, and high bandwidth 4K/8K video applications. Increasing demand for high-speed data and video services is presently driving the access network paradigm bandwidth requirements up to gigabits per second (Gb/s) for residential offerings and multi-Gb/s for business markets in near-future optical access networks. Cable operators, for example, now regularly offer Gb/s service to residential offerings, and access bandwidth requirements therefrom are expected to grow to multi-Gb/s speeds in response to the increasing 4K/8K video streaming, proliferation of cloud computing, "big data," social media, Internet of Things (IoT), and mobile data delivery.

Conventional access network architectures utilize a passive optical network (PON), for example, a Gigabit passive optical network (GPON) within ITU-T, or an Ethernet passive optical network (EPON) within IEEE. PON can be point-to-multipoint (P2MP), and is often an economical alternative to point-to-point Ethernet for moderate to large populations. GPON and EPON have some technical differences in terms of signal encapsulation and dynamic bandwidth allocation, but both PON types are capable of carrying data over fiber through a passive optical network all the way from an optical hub to a customer premise. Both PON types use baseband digital signaling over the fiber to carry information.

In the P2MP paradigm, PON technologies have been one of the dominant architectures to meet the growing high capacity demand for end users, as further evidenced by the progress in standards bodies developing next generation high speed time-division multiplexing PON (TDM-PON) standards. The IEEE 802.3ca 100G Ethernet PON (EPON) Task Force is moving towards the standardization of 25/50G EPON based on wavelength multiplexing of 25 Gbps per single channel. New projects to standardize higher speed PONs, e.g., 50 Gbps, have also been proposed in the ITU-T Q2/SG15 group. There is thus a continuing need for PONs to evolve to provide higher per-subscriber data rates and wider coverage of services and applications, while at the same time minimizing capital expenditure (CAPEX) and operating expenditure (OPEX) costs, and also increasing reconfigurable capability for scalable solutions.

High-speed PON systems based on single wavelength-with-TDM mechanisms have become conventionally adopted to reduce the number of required optical components and the associated costs thereof, and also to save wavelength resources. However, the limited sensitivity of these systems has become a critical challenge to the further development of direct detection-based high-speed PON systems with high power budgets.

Coherent detection technology has offered effective techniques for increasing receiver sensitivity. Within the PON paradigm, recent coherent detection solutions have improved the receiver sensitivity through coherent beating of signal with a clean local oscillator (LO) signal. These recent solutions support longer distance transmissions and greater numbers of end users, while also enabling high access speeds using multi-dimensional and more advanced modulation formats with higher spectral efficiency. Coherent technology further renders possible advanced digital signal processing (DSP) techniques to enable mitigation of optical and electrical impairments (e.g., chromatic dispersion (CD), etc.) in the digital domain. A major challenge, however, to the implementation of coherent detection-based TDM PON systems, which also exists for non-coherent TDM-PON systems, arises from the upstream burst receiver. A conventional TDM-PON system is described further below with respect to FIG. 1.

FIG. 1 is a schematic illustration of a conventional TDM PON system 100. System 100 includes a centralized optical line terminal (OLT) 102, a splitter 104, and a plurality of optical network units (ONUs) 106 (i.e., 1-$n$), which may, for example, be further in communication with a plurality of users or customer premises (not shown). OLT 102 is typically located within a central office, a communications hub, or a headend of optical link, and functions to convert standard signals from a service provider (not shown) to the frequency and framing used by system 100, and also for coordinating multiplexing between conversion devices on ONUs 106. Splitter 104 may represent, for example, a power splitter/combiner.

In the example depicted in FIG. 1, system 100 represents a conventional TDM-PON (e.g., 10G-EPON, 10G-PON (also referred to as XG-PON), etc.) implementing upstream burst technology, in which centralized OLT 102 operably connects with splitter 104 over an optical transport medium 108 (e.g., a single mode fiber (SMF)), which in turn operably connects with ONUs 106 over secondary fibers 110 at different locations throughout the passive optical distribution network (ODN) thereof. In the ODN of conventional TDM PONs, splitter 104 is typically a passive optical power splitter.

In operation of system 100, OLT 102 transmits a downstream burst signal 112, and receives a plurality of upstream burst signals 114. Accordingly, upstream burst signals 114(1), 114(2), 114(2), from different users (i.e., ONUs 106(1), 106(2), 106($n$), respectively) arrive at OLT 102 at different time slots, and with different power levels as depicted in the embodiment illustrated in FIG. 1. OLT 102 is therefore required to realize burst clock and data recovery (BCDR) in a relatively short time, in order to reduce the overhead length of the individual bursts of upstream burst signals 114. However, the dynamic range of received power in the upstream direction from upstream burst signals 114 may often be greater than 15 dB, which presents a challenge to this conventional architecture. That is, in order to achieve burst mode reception for upstream burst signals 114, conventional techniques generally require two processing steps 116 (i.e., executed through computer-executable instructions of a processor or by dedicated hardware units therefor) to obtain synchronized signal detection: (1) burst gain control 118; and (2) burst data recovery 120.

Moreover, in conventional PON system 100, burst amplification is typically realized in the electrical domain using burst-mode limiting transimpedance amplifiers (TIAs). However, an additional challenge is presented by this type of TIA electrical domain implementation, and particularly with respect to high-speed burst signals over 10 Gb/s. This TIA challenge is described further below with respect to FIGS. 2A-B.

FIGS. 2A-B are schematic illustrations of conventional coherent receivers 200, 202. More particularly, coherent receiver 200, FIG. 2A, represents a conventional heterodyne dual-polarization receiver, and coherent receiver 202, FIG. 2B, represents a conventional homodyne dual-polarization receiver. Heterodyne coherent receiver 200 includes an optical receiving portion 204 (e.g., optical hybrid and photodetectors (PDs)) that receives an input optical signal 206 and an input LO signal 208, and outputs electrical signals 210 using a multiple burst TIA 212 for each electrical signal data path. In the heterodyne example illustrated FIG. 2A, two TIAs 212 are shown for two respective output electrical signal data paths 210. Similarly, homodyne coherent receiver 202 includes an optical receiving portion 214 that receives an input optical signal 216 and an input LO signal 218, and outputs electrical signals 220 using multiple burst TIAs 222 for each respective electrical signal data path (i.e., four TIAs 222 for four respective output electrical signal data paths 220). For ease of explanation, optical signal paths are depicted as solid lines, and electrical signal paths are depicted as dashed lines.

The respective architectures of coherent receivers 200, 202 are thus challenged by this requirement of multiple burst TIAs for each different electrical data path for a coherent upstream burst receiver. Furthermore, the respective TIAs 212, 222 must also be linear and identical for each such electrical data path 210, 220 (i.e., 2 or 4 burst linear TIAs for dual-polarization coherent receivers 200 or 202, respectively). Accordingly, there is a desire for an improved technique to implement burst amplification by gain control in the optical domain, as opposed to the conventional technique implemented in the electrical domain, such that the need for burst TIAs may be relaxed, or even eliminated.

BRIEF SUMMARY

In an embodiment, an optical network communication system utilizes a coherent passive optical network (PON). The system includes an optical line terminal (OLT) having a downstream transmitter and an upstream receiver system configured for time-wavelength division coherent detection. The system further includes a splitter in operable communication with the OLT, and a plurality of optical network units (ONUs) in operable communication with the splitter. Each of the plurality of ONUs is configured to (i) receive downstream coherent burst signals from the OLT, and (ii) transmit at least one upstream burst signal to the OLT. The upstream receiver system further includes a power control module and a local oscillator (LO) configured to generate an optical LO signal The power control module is configured to adaptively control, in real-time, a power level of the optical LO signal.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 4A-C are schematic illustrations of local oscillator power control schemes, in accordance with an embodiment.

FIG. 10 is a flow diagram for an automatic power-leveling process that may be implemented with the embodiments described herein.

FIG. 11 is a flow diagram for a command-based power-leveling process that may be implemented with the embodiments described herein.

Figure 1:
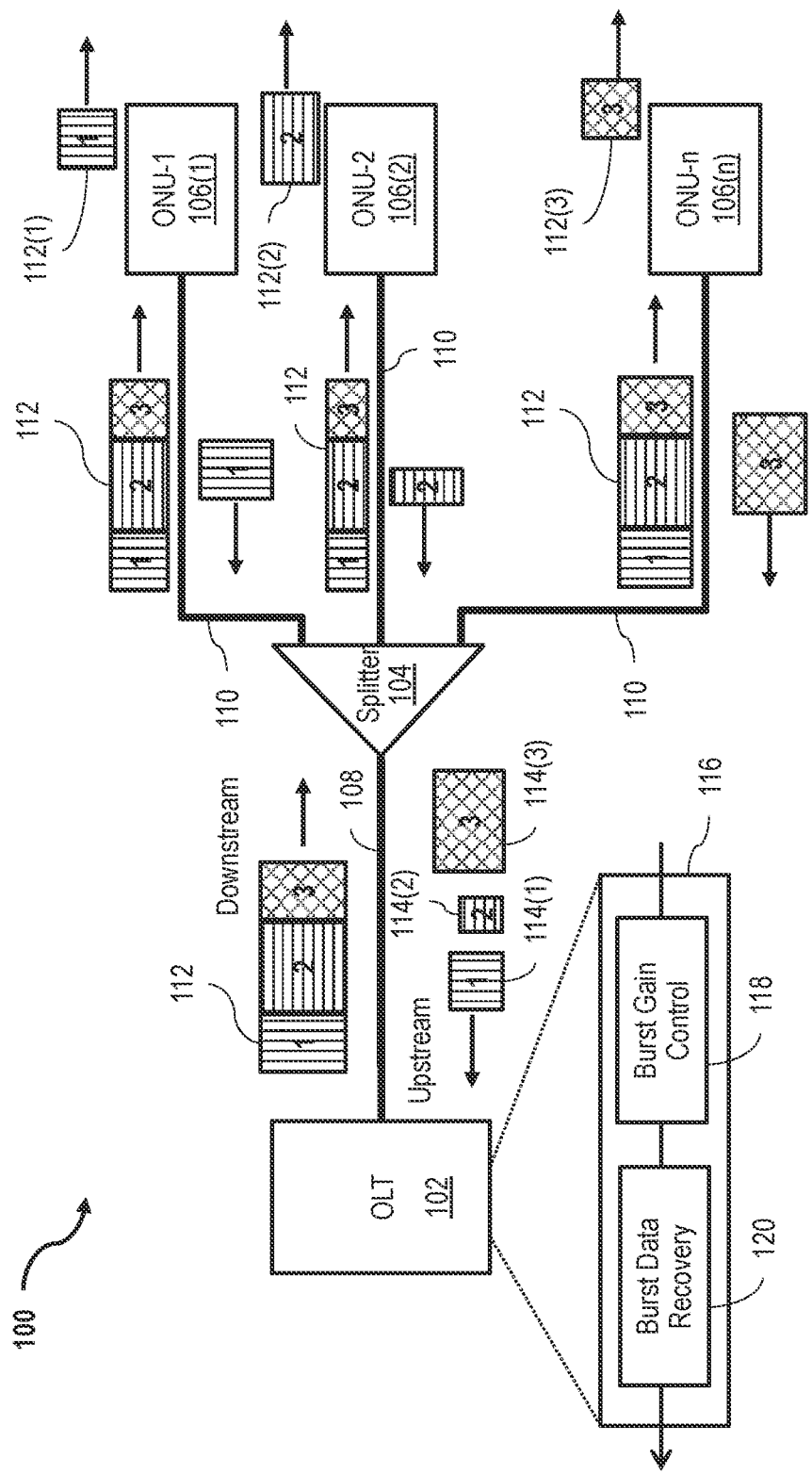
FIG. 1 is a schematic illustration of a conventional time-division multiplexing passive optical network system.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged;

such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

Figures 2A, 2B:
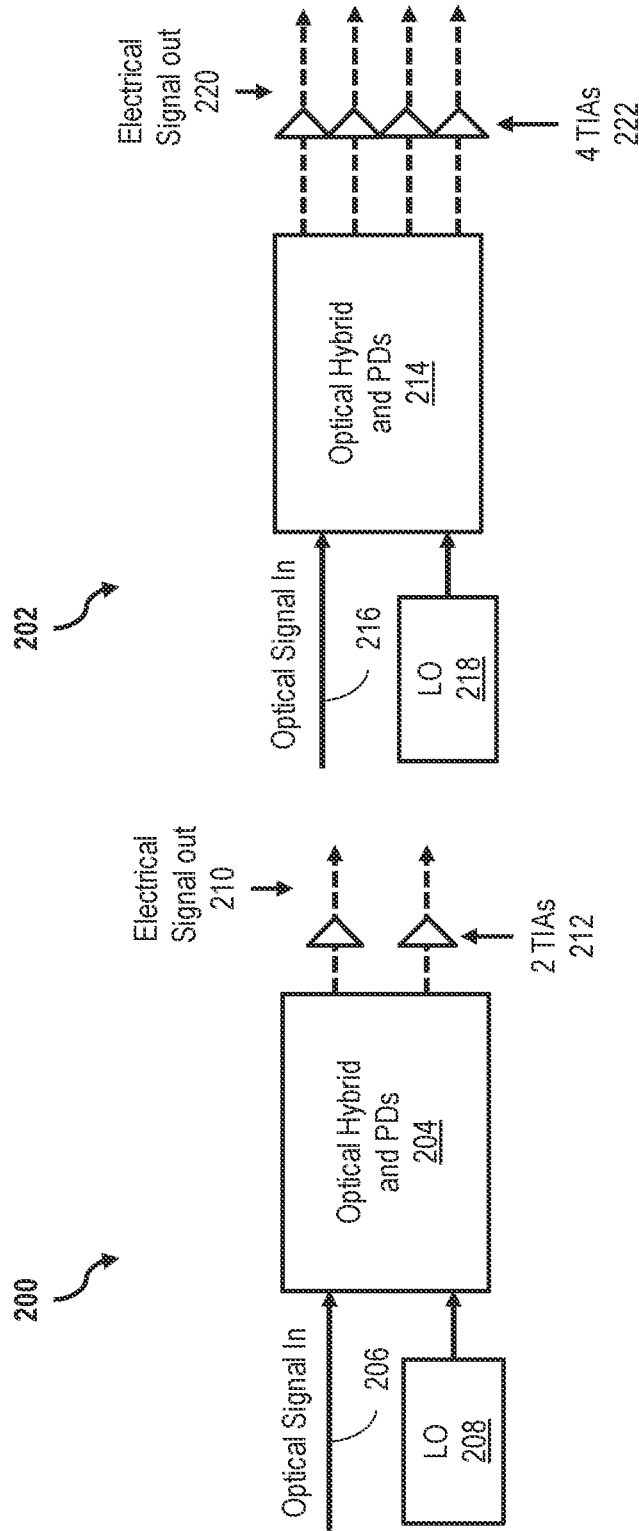
FIGS. 2A-B are schematic illustrations of conventional coherent receivers.

In an exemplary embodiment, systems and methods for burst coherent reception utilizing an LO for coherent detection are described herein. The present embodiments are generally applicable to burst coherent receivers, and are not limited to only the examples of conventional coherent receivers described above with respect to FIGS. 2A-B. The innovative burst control techniques of the present application thus represent a significant improvement over direct detection system schemes that realize burst gain control only by adjusting the gain of an optical preamplifier for the received signal. The present coherent detection systems and methods present new and advantageous burst gain control techniques that adjust the optical output power of LO, thereby directly impacting the coherent gain, as well as the subsequent output electrical signal levels therefrom.

The present systems and methods are also particularly useful in the case where different users (e.g., ONUs) are located at different distance from an OLT, where the respective power of bursts in the received optical signal may be expected to vary across a significantly large dynamic range. Since a coherent receiver often includes one or more analog-to-digital converters (ADCs) having a particular quantization range, techniques according to the present embodiments provide still further improvements over conventional techniques by efficiently obtaining equal or similar electrical signal power for the different signals, which results in a significantly improved optimal receiver performance.

Accordingly, in an exemplary embodiment, improved methods are provided to which effectively realize burst gain control by adaptively adjusting the input LO power. As described further below in greater detail, these improved techniques may be realized with respect to not only different coherent beating gain control mechanisms, but also with respect to different coherent operation schemes and principles. According to these innovative embodiments lower-cost configurations of electrical components may be advantageously realized, thereby significantly reducing the CAPEX and OPEX of the system.

In some embodiments, the present systems and methods need not necessarily fully replace existing power leveling methods in a PON system (e.g., the power leveling used in NG-PON2 to adjust the ONU transmitter power), but may be advantageously implemented in a complementary fashion that improves upon the conventional techniques.

In an embodiment, the present systems and methods further utilize intrinsic properties of coherent beating, which is unique to the coherent detection paradigm, thereby realizing still further advantages, including without limitation: (i) an effective method for realizing burst gain control in the optical domain based on the unique nature of the coherent beating gain in coherent detection; (ii) a relaxation or elimination of the need for burst TIAs in the electrical domain, by achieving burst gain control in the optical domain, thereby significantly reducing the equipment and operational cost of coherent receivers that would otherwise require multiple TIAs; and (iii) simplification and further cost reduction of LO power control, in comparison with conventional techniques for burst optical amplification of received signals (e.g., using burst EDFA as pre-amplification for the received signal), through advantageous utilization of the continuous LO signal having constant optical power, whereas received signals in the burst mode will have a high dynamic range.

Figure 3:
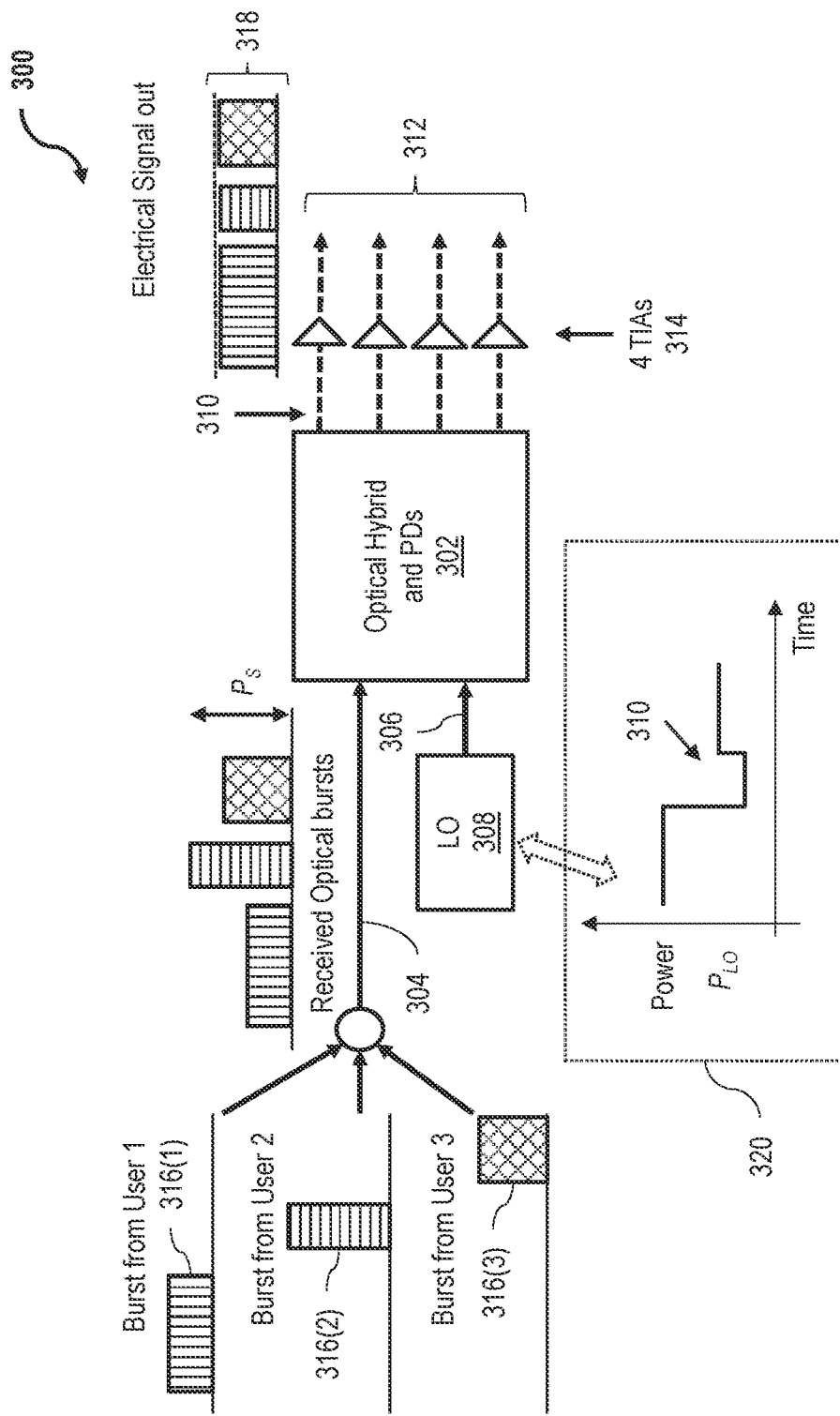
FIG. 3 is a schematic illustration depicting an operation principle of an exemplary coherent receiver system for a coherent passive optical network, in accordance with an embodiment.

FIG. 3 is a schematic illustration depicting an operation principle of an exemplary coherent receiver system 300 for a coherent PON (not separately illustrated, also referred to as a CPON). In the embodiment depicted in FIG. 3, coherent receiver system 300 is shown as being structurally similar to homodyne dual-polarization receiver 202, FIG. 2B, except that coherent receiver system 300 is configured to adaptive power control techniques for optimizing performance of coherent receiver system 300. As discussed above, the particular structural configuration of coherent receiver system 300 is provided by way of illustration, and not in a limiting sense. The adaptive power control techniques described herein are applicable to other coherent detection burst receivers (heterodyne, homodyne, intradyne, etc.) using an LO.

In an exemplary embodiment, coherent receiver system 300 is disposed within, or a portion of, an OLT (e.g., OLT 102, FIG. 1), and includes an optical receiving portion 302 configured to receive an input optical signal 304 (e.g., over an SMF) and an LO signal 306 from an LO 308. In this example, optical receiving portion 302 is further configured to output electrical signals 310 over respective electrical signal paths 312 using multiple burst TIAs 314 for each respective electrical signal path 312 (e.g., four TIAs 314 for four respective electrical signal paths 312, in this example). Input optical signal 304 includes a plurality of bursts 316 from a respective plurality of users (e.g., ONUs 106, FIG. 1, not shown in FIG. 3). Similar to the examples described above, optical signal paths are again depicted with solid lines, and electrical signal paths are depicted with dashed lines.

Exemplary architectures of coherent PON architectures, as well as the respective components thereof, are described in greater detail in U.S. Pat. Nos. 9,912,409, 10,200,123, and co-pending U.S. patent application Ser. No. 15/609,461, filed May 31, 2017, to the present inventors, the disclosures of all of which are incorporated by reference herein.

In exemplary operation of coherent receiver system 300, adaptive power control of LO 308 through innovative exploitation of intrinsic coherent detection properties. For example, the amplitude of the electrical signal alternating current (AC) after photodetectors (e.g., output electrical signal 310) is dependent on the power of LO signal 306 and input optical signal 304. Assuming a responsivity is R, the amplitude of the AC signal, $A_{ac}$, after the photodetectors may be expressed according to:

$$A_{ac} \propto 2R\sqrt{P_S P_{LO}}, \quad \text{(Eq. 1)}$$

where $P_S$ represents the power of input optical signal 304 at optical receiving portion 302, and $P_{LO}$ represents the power of LO signal 306 at optical receiving portion 302.

Nevertheless, because different users generating respective bursts 316 may be located at various different distances from optical receiving portion 302, the power $P_S$ of bursts 316 in received input optical signal 304 may vary over a substantially large range. According to the exemplary embodiment depicted in FIG. 3 though, an equal amplitude electrical signal 318 is achieved after coherent detection by optical receiving portion 302, by controlling the power $P_{LO}$ of LO signal 306 at LO 308 according to:

$$P_{LO} \propto (A_{ac}/2R)^2/P_S \quad \text{(Eq. 2)}$$

That is, according to an exemplary operation of coherent receiver system 300, LO power $P_{LO}$ is controlled, as opposed to the conventional techniques that require use of a burst optical preamplifier to change the signal power. In an exemplary embodiment, the power control of LO 308 is performed adaptively. Thus, through adaptive power control of LO 308, after coherent detection by coherent receiving portion 302, an optimal demodulation condition (e.g., equal amplitude electrical signal 318) of the received signal (e.g., input optical signal 304) is achieved such that the respective amplitudes of the subsequent corresponding electrical bursts have equal or similar burst amplitudes, i.e., power levels.

In an exemplary embodiment, the LO power is adaptively controlled according to the respective power levels $P_{S1}$, $P_{S2}$, $P_{S3}$ of individual bursts 316 over time. As illustrated in graphical LO power plot 320, $P_{LO}$ may be adaptively controlled such that a power level 322 of $P_{LO}$ over time is inversely related to the burst signal power $P_{S1}$ at any given time. Exemplary LO power control techniques are described further below with respect to FIGS. 4-7.

FIGS. 4A-C are schematic illustrations of LO power control schemes 400, 402, 404, respectively. Power control schemes 400, 402, 404 represent, for example, alternative approaches to realize the present techniques for burst LO power control in a PON system (e.g., PON system 100, FIG. 1). One or more of the power control schemes 400, 402, 404 may be particularly useful in the case where a varying burst length in a PON system requires a burst gain control frequency over a substantial frequency range (e.g., tens of megahertz or greater).

In an embodiment of a first approach, power control scheme 400, FIG. 4A, is implemented with respect to an LO 406 including a laser source 408, and a power control module 410 in operable communication with LO 406. In some embodiments, power control module 410 is a separate component from LO 406. In other embodiments, power control module 410 is an integral component of LO 406. In exemplary operation of power control scheme 400, power control module 410 functions to provide direct control of the laser drive voltage of laser source 408 to change (e.g., adaptively) the LO power of an output LO signal 412 from LO 406. LO 406 may include one or more additional hardware and/or processing components that are not shown in FIG. 4A, for ease of explanation. Of the several exemplary approaches depicted in FIGS. 4A-C, power control scheme 400 represents the simplest structural and operational setup, but may require a high-performance frequency and chirp control laser for laser source 408 in the case where LO frequency drift or chirping may be problematic in the relevant PON system.

In an embodiment of a second approach, power control scheme 402, FIG. 4B, is similar to power control scheme 400, FIG. 4A, and is similarly implemented with respect to an LO 414 including a laser source 416, and a power control module 418. Power control scheme 402 differs though, from power control scheme 400, in that LO 414 further includes an optical amplifier 420, and power control module 418 functions to control optical amplifier 420, thereby enabling LO 414 to keep the laser drive voltage of laser source 416 fixed. According to power control scheme 402, power control of an output LO signal 422 is achieved by adjusting the gain of optical amplifier 420 after laser source 416. In an embodiment, optical amplifier 420 may include one or more of a semiconductor optical amplifier (SOA), a fiber amplifier, or another type of amplifier. According to power control scheme 402, frequency drift problems are effectively solved, and use of optical amplifier 420 further provides a relatively fast gain control response over a significantly broad frequency range (e.g., tens of megahertz or greater).

In an embodiment of a third approach, power control scheme 404, FIG. 4C, is similar to power control scheme 402, FIG. 4B, and is similarly implemented with respect to an LO 424 including a laser source 426 and an optical amplifier 428, and a power control module 430. Power control scheme 404 differs though, from power control scheme 402, in that LO 424 further includes a variable optical attenuator (VOA) 432 after optical amplifier 428, and power control module 430 functions to control variable optical attenuator 432, thereby enabling LO 424 to keep both the laser drive voltage of laser source 426 and the gain of optical amplifier 428 fixed. According to power control scheme 404, power control of an output LO signal 434 is achieved by adjusting the attenuation of variable optical attenuator 432 after optical amplifier 428, and is particularly effective in the case where variable optical attenuator 432 is a fast response VOA.

For ease of explanation, the respective techniques of power control schemes 400, 402, 404 are described separately above. Nevertheless, the person of ordinary skill in the art, after reading and comprehending the present written disclosure, will understand that one or more of power control schemes 400, 402, 404 may be implemented together in a complementary manner, or one or more parameters of the several components thereof may be simultaneously subject to control by one or more power control modules. For example, in at least one embodiment, each of a laser source, an operational amplifier, and a variable optical attenuator may be in operable communication with a power control module, or the same power control module, and subject to control thereby.

Figure 5:
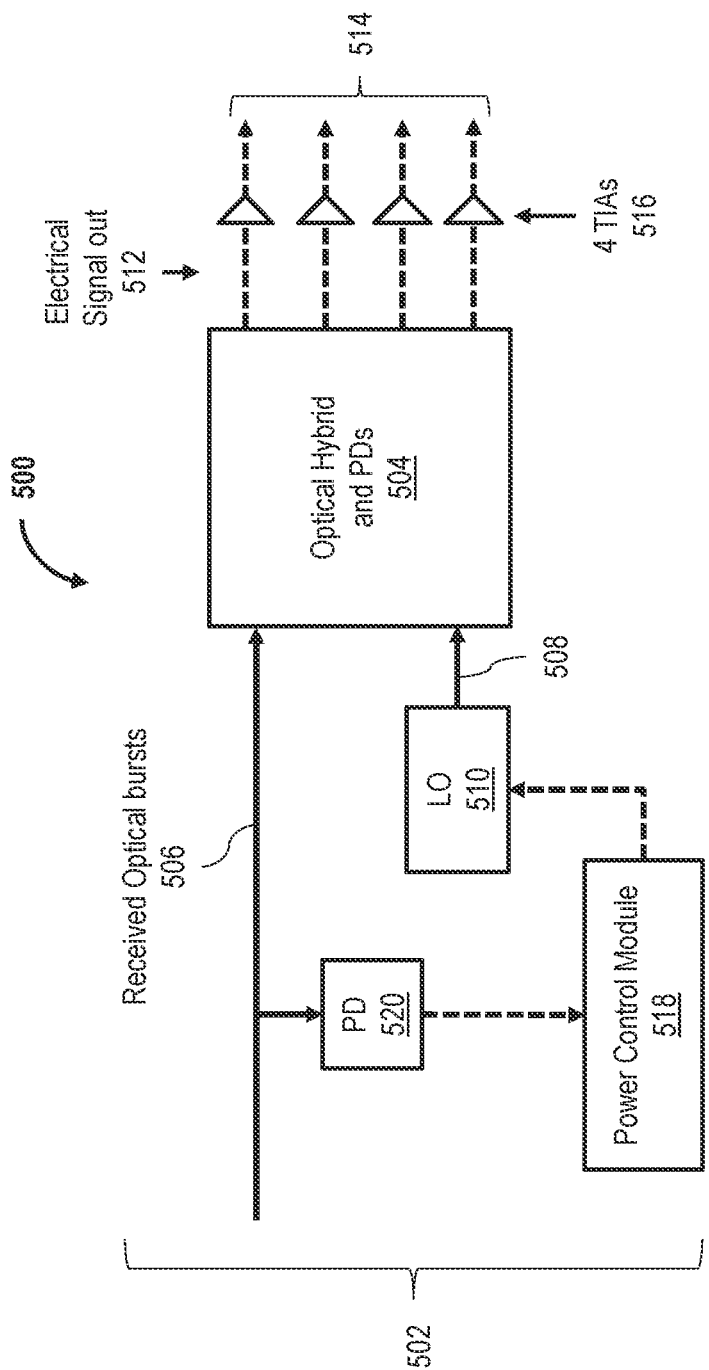
FIG. 5 is a schematic illustration of a feedforward automatic local oscillator power control scheme, in accordance with an embodiment.

FIG. 5 is a schematic illustration of a feedforward automatic LO power control scheme 500. In an exemplary embodiment, power control scheme 500 is implemented with respect to a coherent receiver system 502 of a coherent PON system (not shown in FIG. 5). In some embodiments, power control scheme 500 may incorporate one or more of power control schemes 400, 402, 404, FIGS. 4A-C, respectively, or may be implemented in a supplemental or alternative manner thereto. In the example depicted in FIG. 5, coherent receiver system 502 is similar to coherent receiver system 300, FIG. 3, and includes an optical receiving portion 504 configured to receive an input optical burst signal 506 (e.g., including a plurality of bursts, not shown in FIG. 5) and an LO signal 508 from an LO 510, and output electrical signals 512 over respective electrical signal paths 514 using multiple burst TIAs 516 for each respective electrical signal path 514 (e.g., four TIAs 516 for four respective electrical signal paths 514, in this example).

In an exemplary embodiment, coherent receiver system 502 further includes a power control module 518 in operable communication with LO 510, and at least one photodetector 520 in optical communication with input optical burst signal 506 and electrical communication with power control module 518. In exemplary operation of feedforward power control scheme 500, photodetector 520 is disposed on the receiver-side of optical receiving portion 504 and taps/taps out a portion of the received bursts of input burst optical signal 506. In this manner, photodetector 520 thus functions to monitor the received optical signal power of input burst optical signal 506 in real-time and feed the monitored power levels forward to power control module 518 to enable adaptive power control of LO 510.

In an embodiment, power control module 518 includes sufficient processing and memory hardware and/or software to enable power control module 518 to function as an intelligent unit that controls the power of LO 510 and LO signal 508, and such that the amplitude of subsequent electrical signals 512 are tailored to ensure substantially the same output levels for the corresponding electrical bursts. In some embodiments of power control scheme 500, each burst may be given an overhead to provide sufficient time for power control, if desired.

In an exemplary embodiment, LO 510 may be any one of LO 406, FIG. 4A, LO 414, FIG. 4B, and LO 424, FIG. 4C, and operate according to the relevant power control scheme thereof (or a hybrid structure/scheme, as described above). As with the exemplary embodiments described above, the homodyne structural configuration of coherent receiver system 502 is depicted for illustrative purposes, and not in a limiting sense.

In at least one embodiment, power control scheme 500 may be implemented with respect to a coherent PON system including a physical (PHY) layer, and may perform signal power monitoring based on the PHY layer signal power, but without needing upper layer information. In the case where monitoring of PHY layer signal power is implemented, coherent receiver system 502 may further utilize a portion of the received signal (e.g., received optical burst signal 506), as well as additional hardware components, to realize a sufficiently fast response, where desired.

Figure 6:
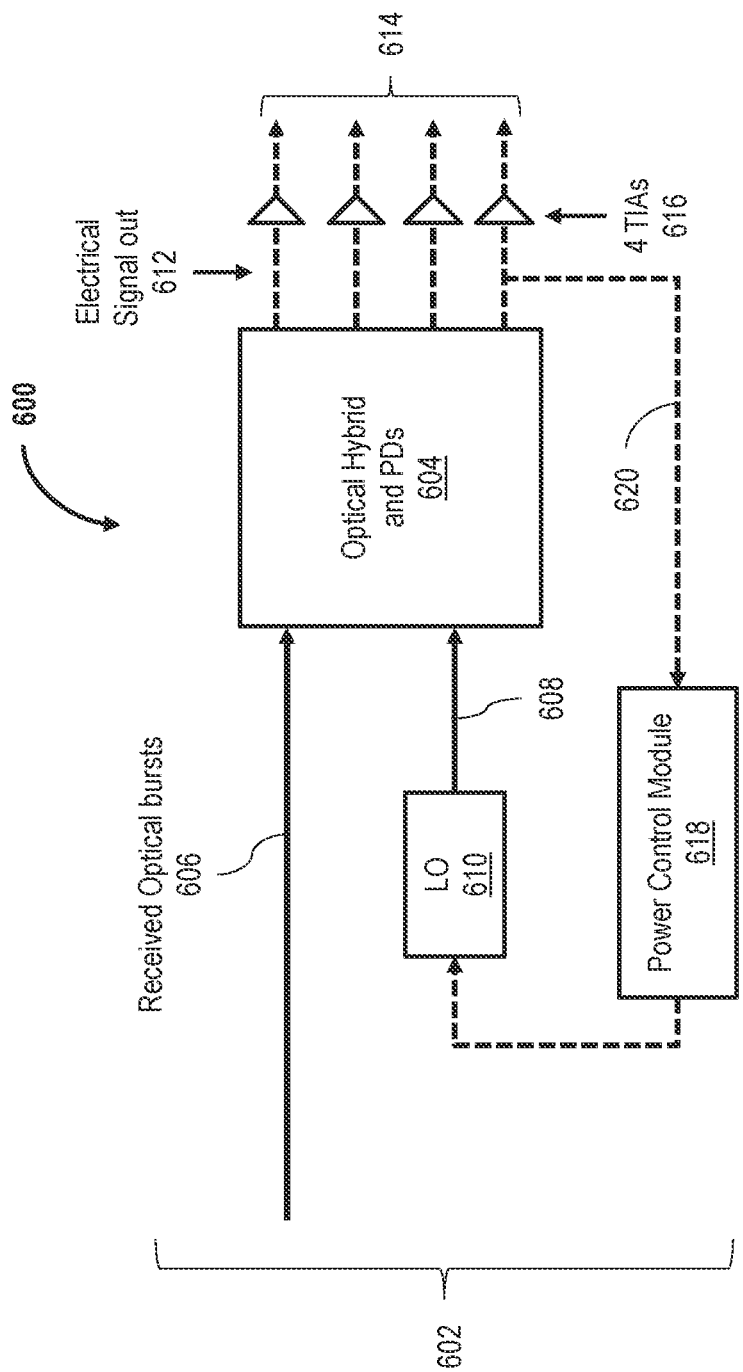
FIG. 6 is a schematic illustration of a feedback automatic local oscillator power control scheme, in accordance with an embodiment.

FIG. 6 is a schematic illustration of a feedback automatic LO power control scheme 600. In an exemplary embodiment, power control scheme 600 is similar in some respects to power control scheme 500, and implemented with respect to a coherent receiver system 602 of a coherent PON system (not shown in FIG. 6), which includes an optical receiving portion 604 configured to receive an input optical burst signal 606 (e.g., including a plurality of bursts, not shown in FIG. 6) and an LO signal 608 from an LO 610, and output electrical signals 612 over respective electrical signal paths 614 using multiple burst TIAs 616 for each respective electrical signal path 614 (e.g., four TIAs 616 for four respective electrical signal paths 614, in this example). Also similar to the implementation of power control scheme 500 described above, coherent receiver system 602 further includes a power control module 618 in operable communication with LO 610.

In exemplary operation of feedback power control scheme 600, and different from feedforward power control scheme 500, coherent receiver system 602 further includes a feedback loop 620 based on the power of electrical signals 612 after coherent detection. In an embodiment, power control module 618 uses feedback loop 620 to adaptively control the power of LO 610 until output electrical signals 612 are in a desired optimal range. In at least one embodiment, LO 610 is set to an initial LO power value, which may be an average power value based on a power budget calculation for the relevant PON system. In some embodiments, each burst frame may be further provided with a sufficient overhead to enable a desired convergence. Similar to power control scheme 500, power control scheme 600 may also incorporate one or more of power control schemes 400, 402, 404, FIGS. 4A-C, respectively, alone or in a hybrid manner.

Figure 7:
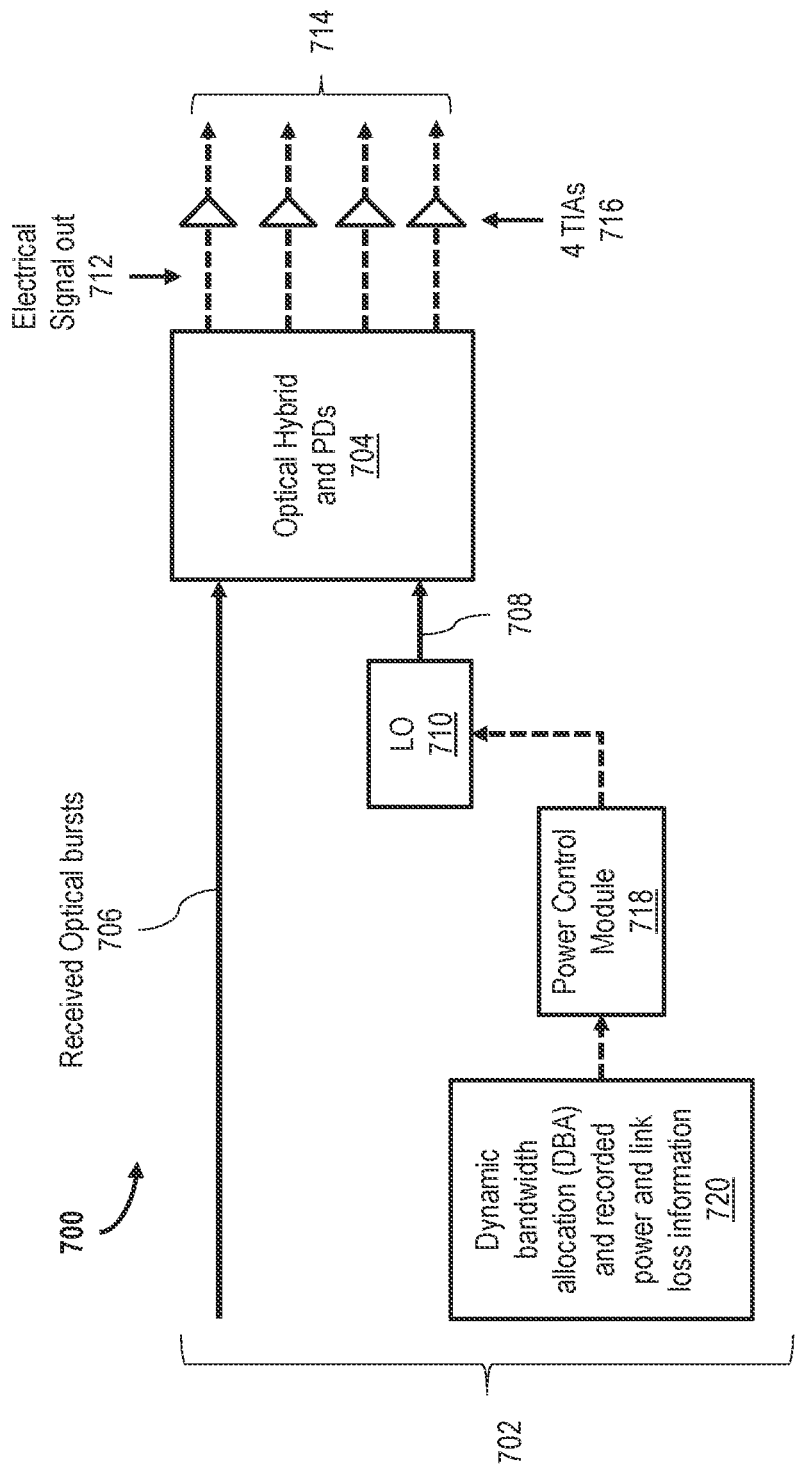
FIG. 7 is a schematic illustration of a dynamic bandwidth allocation power control scheme, in accordance with an embodiment.

FIG. 7 is a schematic illustration of a dynamic bandwidth allocation (DBA) power control scheme 700. In an exemplary embodiment, power control scheme 700 is also similar in some respects to power control scheme 500, and implemented with respect to a coherent receiver system 702 of a coherent PON system (not shown in FIG. 7), which includes an optical receiving portion 704 configured to receive an input optical burst signal 706 (e.g., including a plurality of bursts, not shown in FIG. 7) and an LO signal 708 from an LO 710, and output electrical signals 712 over respective electrical signal paths 714 using multiple burst TIAs 716 for each respective electrical signal path 714 (e.g., four TIAs 716 for four respective electrical signal paths 714, in this example). Also similar to the implementation of power control scheme 500 described above, coherent receiver system 702 further includes a power control module 718 in operable communication with LO 710.

In exemplary operation of feedback power control scheme 700, and different from feedforward power control scheme 500, coherent receiver system 702 further includes a DBA unit 720 configured to record power and link loss information of the coherent PON system and generate a DBA map (MAP). Using the DBA MAP from DBA unit 720, the OLT (not shown in FIG. 7) in which the coherent upstream burst receiver of coherent receiver system 702 is located, is enabled to manage the upstream bandwidth allocation through the DBA MAP.

In an exemplary embodiment, the OLT further includes a ranging mechanism, or ranging capability, for measuring the transmission delays of each ONU, since the different ONUs of the PON system are likely in different locations, with different respective distances to the OLT and the coherent upstream burst receiver. In this scenario, each ONU may register and range, and thereby provide the relevant delay/distance information for DBA unit 720. Once each ONU is properly registered in the DBA MAP, the ONUs may be instructed to only transmit the respective upstream burst signal(s) in a "request-grant protocol," which may be controlled by the OLT. Accordingly, using the DBA MAP information of DBA unit 720, the OLT will know exactly the location from where each burst was transmitted, and when each such burst will arrive at the OLT. That is, the power of LO 710 may be adaptively controlled based on the DBA MAP information from DBA unit 720. Similar to power control scheme 500, power control scheme 700 may also incorporate one or more of power control schemes 400, 402, 404, FIGS. 4A-C, respectively, alone or in a hybrid manner.

In some cases, the link loss will not be known during the registration of one or more of the ONUs. In this scenario, DBA power control scheme 700 may further implement one or more approaches based on MAC layer and PHY layer collaboration (described further below with respect to FIGS. 8 and 9) to set the LO power and initialize proper registration for ONUs without requiring link loss information.

Figure 8:
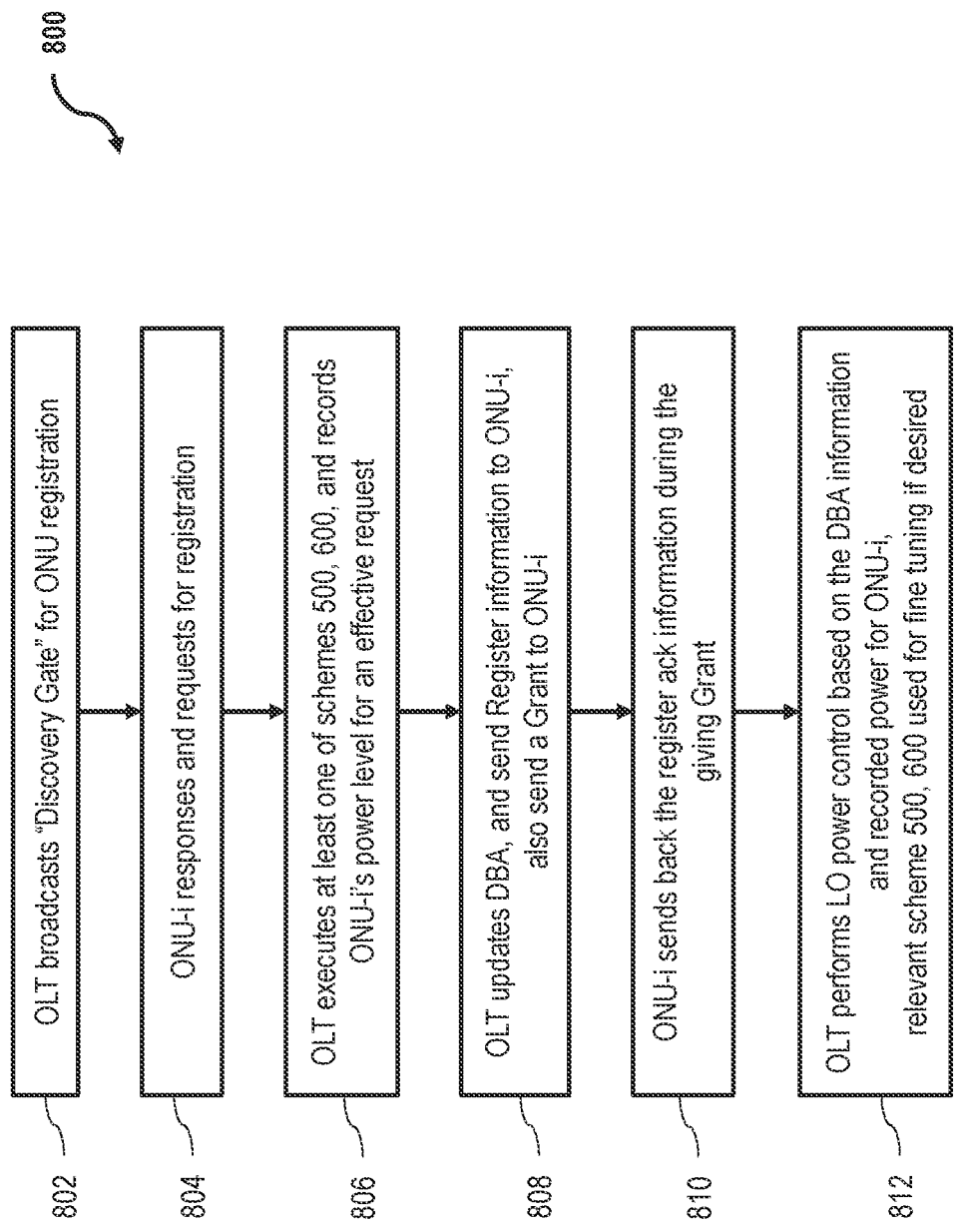
FIG. 8 is a flow diagram for an exemplary registration process that may be implemented with the embodiments described herein.

FIG. 8 is a flow diagram for an exemplary registration process 800 that may be implemented with the embodiments described herein. In an exemplary embodiment, process 800 is implemented with respect to an OLT (e.g., OLT 102, FIG. 1) and one or more ONUs (e.g., ONUs 106, FIG. 1) of a coherent PON system (e.g., system 100, FIG. 1) using an intelligent coherent burst mode receiver (e.g., coherent receiver systems 300, FIG. 3, 502, FIG. 5, 602, FIG. 6, 702, FIG. 7) with an LO (e.g., LOs 308, FIG. 3, 406, FIG. 4A, 414, FIG. 4B, 424, FIG. 4C, 510, FIG. 5, 610, FIG. 6, 710, FIG. 7). Unless described to the contrary, individual steps of process 800 may be performed in the order described, a different order, or two more of the steps may be performed simultaneously.

In an embodiment, process 800 implements DBA power control scheme 700, FIG. 7, jointly with at least one of feedforward power control scheme 500, FIG. 5, and feedback power control scheme 600, FIG. 6. Feedforward power control scheme 500 and feedback power control scheme 600, for example, generally require longer response times in comparison with DBA power control scheme 700. That is, where feedforward power control scheme 500 and feedback power control scheme 600 will be dependent on the relative speed of the respective components thereof, DBA power control scheme 700 would operate much faster relative to the other schemes since the intelligent processing (e.g., of power control unit 718 and/or DBA unit 720) knows in advance when each burst will arrive.

Thus, when operated jointly with DBA scheme 700 as described herein, feedforward scheme 500 and feedback scheme 600 advantageously provide further fine power control due to the direct power measurements of the respective received signals. DBA scheme 700 may therefore be described as providing coarse power control, relative to feedforward scheme 500 and/or feedback scheme 600. Such joint operation of DBA scheme 700 with feedforward scheme 500 and/or feedback scheme 600 may be realized through process 800 as described further below.

In the exemplary embodiment, process 800 begins at step 802, in which the OLT broadcasts a "Discovery Gate" to the coherent PON system for ONU registration. In step 804, at least one ONU (e.g., "ONU-i") responds to the Discovery Gate broadcast and requests registration with the OLT. In step 806, the OLT executes at least one of feedforward scheme 500 and feedback scheme 600, and records the power level of the registering ONU for an effective request. In step 808, the OLT updates the DBA unit (e.g., DBA unit 720, FIG. 7), and transmits registration information to the ONU. In an exemplary embodiment of step 808, the OLT further sends a Grant to the ONU.

In step 810, the ONU sends back to the OLT the register acknowledgement information during the period of the given Grant. In step 812, the OLT performs LO power control (e.g., of LO 710 by power control module 718, FIG. 7) based on the DBA information from the DBA unit (e.g., DBA unit 720). In an exemplary embodiment of step 812, LO power control is further based on recorded power for the ONU, obtained from the DBA unit. In at least one embodiment of step 812, the relevant feedforward scheme 500 and/or feedback scheme 600 is further utilized for fine tuning of the LO power level, if desired.

Figure 9:
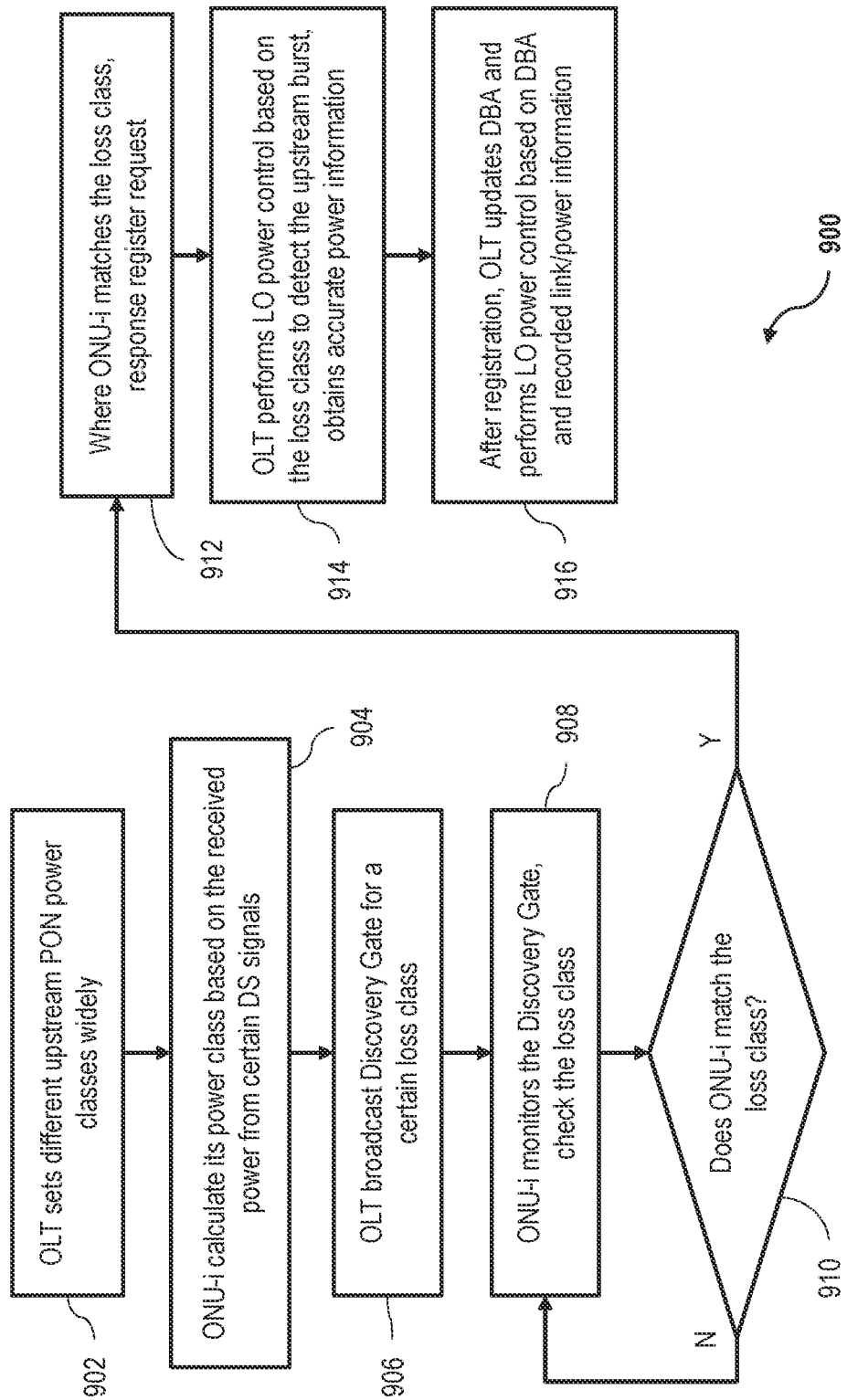
FIG. 9 is a flow diagram for an alternative registration process that may be implemented with the embodiments described herein.

FIG. 9 is a flow diagram for an alternative registration process 900 that may be implemented with the embodiments described herein. Process 900 is similar to process 800, FIG. 8, in that process 900 is implemented with respect to an OLT and one or more ONUs of a coherent PON system using an intelligent coherent burst mode receiver with an LO implementing DBA power control scheme 700, FIG. 7. Process 900 differs from process 800 though, in that process 900 does not necessarily integrate either of feedforward power control scheme 500 or feedback power control scheme 600 jointly with DBA power control scheme 700.

Process 900 is therefore of particular value for ONU registration when LO power control is DBA-based, and different power classes or groups of upstream bursts are encountered. Process 900 may thus utilize DBA power control scheme 700 independently of other power control schemes (if desired), through message exchanges between the OLT and the ONU(s) and ONU registration according to the different power classes. Unless described to the contrary, individual steps of process 900 may be performed in the order described, a different order, or two more of the steps may be performed simultaneously.

In the exemplary embodiment, process 900 begins at step 902, in which the OLT establishes a relatively wide range of different upstream PON power classes. In step 904, at least one ONU (e.g., "ONU-i") determines or calculates its own power class based on the received power from particular downstream signals. That is, in step 902, the OLT sets different upstream burst power classes widely for the PON, and in step 904, the ONU is enabled to calculate its own power class based on downstream (DS) signals from the OLT.

In step 906, the OLT broadcasts the Discovery Gate, for a particular loss class, to the coherent PON system. In step 908, the ONU monitors the Discovery Gate to check the particular loss class. Step 910 is a decision step. In step 910, the ONU determines whether the loss class of the ONU matches the particular loss class broadcast from the OLT. If the loss class of the ONU does not match the particular loss class from the OLT, process 900 returns to step 908.

If, however, in step 910, the ONU determines that its loss class is a match for the particular loss class from the OLT, process 900 proceeds to step 912, in which the ONU responds to the OLT broadcast with a registration request. In step 914, the OLT performs LO power control based on the matched loss class to detect an upstream burst from the ONU. In an exemplary embodiment of step 914, the OLT further obtains the accurate power information from the ONU and records the obtained power information (e.g., in DBA unit 720, FIG. 7). In step 916, the ONU is registered with the OLT. In an exemplary embodiment of step 916, after registration of the ONU, the OLT updates the DBA unit and performs DBA-based LO power control based on DBA and the recorded link/power information (i.e., according to DBA power control scheme 700).

According to the exemplary operation flow of process 900, the ONUs would only respond to the Discovery Gate for that ONU's own class, and the OLT would therefore have reliably accurate power control information for the responding ONU(s), whether the power control information was measured by the OLT itself, or reported by the ONU. Accordingly, once the ONU is registered, the OLT is enabled to perform LO power control based on an updated DBA MAP, as well as significantly more accurate power information.

In accordance with one or more of the innovative embodiments described herein, or combinations and/or subcombinations thereof, intelligent LO power control processing for coherent burst reception may further implement power-leveling techniques at the ONU upstream transmitter. That is, the one or more of the present LO power control schemes may be implemented at the OLT-side (coherent burst receiver), with power-leveling implemented at the ONU-side (coherent burst transmitter). As used herein, "power-leveling" refers to techniques for controlling the transmitter output power at the ONU-side, in order to reduce the dynamic range of the receiver input power in the upstream bursts received at the OLT-side.

In an exemplary embodiment, the present power-leveling techniques are based on transmitter and receiver power information, and therefore these techniques may be implemented in a fully complementary fashion with one or all of the LO power control schemes described above. In a typical coherent PON system, given that the dynamic range of the ODN is large, and in consideration of the various differences in laser output power from the respective ONUs, the total dynamic range of received optical power in the upstream may be larger than 20 dB, which may exceed the tuning range in which ONU-side power leveling may be accomplished only at the ONU. According to the present power-leveling techniques though, the OLT and the ONU may operate cooperatively, such that the tuning ranges for both power leveling and LO power control may be advantageously reduced. As described further below with respect to FIGS. 10 and 11, the present power-leveling techniques may be realized according to automatic or command-based mechanisms.

FIG. 10 is a flow diagram for an automatic power-leveling process 1000 that may be implemented with the embodiments described herein. In an embodiment, process 1000 represents a functional flow of an automatic mechanism for ONU-side power-leveling and OLT-side LO power control. In the exemplary embodiment, process 1000 begins at step 1002, in which the OLT broadcasts the transmitter output power of the OLT in the downstream signal to the ONUs. In step 1004, at least one ONU (e.g., ONU-i) measures the received optical power. In step 1006, the respective ONU performs automatic power-leveling and sends its resultant burst(s) in the upstream signal. In step 1008, after receiving a power-leveled burst from the ONU, the OLT performs LO power control according to one or more of the schemes described herein.

According to the exemplary operation of process 1000, the ONUs are enabled to automatically perform power-leveling on their own upstream burst transmissions based on the received power of the downstream signals from the OLT. The OLT is then enabled to perform the desired LO power control scheme for the residual power differences from each burst. In an exemplary embodiment of process 1000, either the ONUs or the OLT may be further configured to periodically execute the relevant steps of process 1000. In some embodiments, since process 1000 is initiated by the OLT, process 1000 may be completed during one or more of the registration processes described above with respect to FIGS. 8 and 9. In other embodiments, process 1000 may be completed after registration.

FIG. 11 is a flow diagram for a command-based power-leveling process 1100 that may be implemented with the embodiments described herein. In an embodiment, process 1100 represents a functional flow of a command-based mechanism for ONU-side power-leveling and OLT-side LO power control. Command-based process 1100 thus differs from automatic process 1000, FIG. 10, in that both of the LO power control and the ONU power-leveling operations in process 1100 are based on commands from the OLT, which may in some cases require message exchange(s) between the OLT and the ONU(s). In an exemplary embodiment of process 1100, the OLT obtains power information for the ONU(s) in the upstream signals from the ONU(s) (e.g., measurement at the OLT-side or reporting from the ONU-side).

In the exemplary embodiment, process 1100 begins at step 1102, in which an ONU (e.g., ONU-i) reports its power status information to the OLT. In step 1104, the OLT updates the power status information for the reporting ONU. In step 1106, the OLT sets an LO power control value, and sends a power-leveling command to the reporting ONU. In step 1108, the ONU performs power-leveling based on the received command from the OLT. In an exemplary embodiment of step 1108, after power-leveling by the ONU, the OLT may perform LO power control according to one or more of the schemes described herein.

According to the exemplary operation of process 1100, since process 1000 is initiated at the ONU, process 1100 is optimally completed after registration (e.g., according to registration process 900, FIG. 9). In an embodiment, the relevant power status information may include one or more of the transmitter power, the received power, and the estimated ODN loss. In at least one embodiment, the OLT may update this information and execute command-based process 1100 periodically.

According to the innovative systems and methods described herein, effective techniques for realizing received burst gain control are achieved through adaptive adjustment of the input LO power. Several different LO power control schemes are described herein, and with respect to several different implementation processes for intelligent control of the LO power in a coherent optical receiver. These schemes are further capable of implementation according to complementary innovative techniques for ONU registration and cooperative ONU-side power-leveling.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be substituted with, or further include protocols such as EPON, RFoG, GPON, Satellite Internet Protocol, without departing from the scope of the embodiments herein. The present embodiments are therefore particularly useful for communication systems implementing a DOCSIS protocol, and may be advantageously configured for use in existing 4G and 5G networks, and also for new radio and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processor (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A coherent optical receiver for a coherent network, comprising:
    a local oscillator (LO) configured to generate a variable power output LO signal;
    an optical receiving portion configured to receive an input optical burst signal from the coherent network, the optical receiving portion including one or more receiving photodetectors configured to generate an output electrical signal; and
    a power control module in electrical communication with the LO, and configured to adaptively control a power level of the variable power output LO signal in relation to an inverse of a power level of the input optical burst signal.

2. The receiver of claim 1, wherein the one or more receiving photodetectors have a responsivity R, wherein the power level of the variable power output LO signal is represented by $P_{LO}$, wherein the amplitude of the output electrical signal is represented by $A_{ac}$, and wherein the power level of the input optical burst signal is represented by $P_S$, the output LO signal power level $P_{LO}$ follows the relationship:

$$P_{LO} \propto (A_{ac}/2R)^2/P_S.$$

3. The receiver of claim 1, wherein the input optical burst signal includes a first burst received during a first time slot and a second burst received in a second time slot different from the first time slot.

4. The receiver of claim 3, wherein an output LO signal power level $P_{LO}$ is inversely related to a power level $P_{S1}$ of the first burst during the first time slot, and wherein the output LO signal power level $P_{LO}$ is inversely related to a power level $P_{S2}$ of the second burst during the second time slot.

5. The receiver of claim 1, wherein the power control module comprises (i) a control input, and (ii) a control output in electrical communication with the LO for adaptively controlling the power level of the variable power output LO signal.

6. The receiver of claim 5, further comprising one or more amplifiers in electrical communication with the output electrical signal of a respective photodetector of the one or more receiving photodetectors.

7. The receiver of claim 6, further comprising a feedback loop electrically connecting the control input to the output electrical signal at location between the one or more receiving photodetectors and the one or more amplifiers.

8. The receiver of claim 5, further comprising a monitoring photodetector in direct optical communication with the input optical burst signal from the coherent network, and in direct electrical communication with the control input of the power control module, wherein the monitoring photodetector is configured to tap a portion of the input optical burst signal and generate a real-time power level of the input optical burst signal as an electrical feedforward signal to the control input.

9. The receiver of claim 5, further comprising a dynamic bandwidth allocation (DBA) unit in electrical communication with the control input of the power control module, wherein the DBA unit is configured to record power and link loss information of the coherent network and generate a DBA MAP, and wherein the power control module is further configured to adaptively control the power level of the variable power output LO signal based on MAP information from the DBA MAP received at the control input.

10. The receiver of claim 1, wherein (i) an initial power level of the variable power output LO signal is an average power value based on a power budget calculation for the coherent network, and (ii) subsequent power levels of the variable power output LO signal, after the initial power level, are dynamically based on the control output of the power control module.

11. The receiver of claim 1, wherein the power level of the variable power output LO signal is controlled, at least in part, according to a location of the receiver recorded in a MAP information.

12. A method of registering a first upstream coherent optical transceiver of a plurality of upstream coherent optical transceivers, the method performed by a downstream coherent optical transceiver in operable communication with the plurality of upstream coherent optical transceivers over an optical transport medium in a coherent passive optical network (PON), the downstream optical transceiver including (i) a receiver portion, (ii) a local oscillator (LO) providing an LO signal to the receiver portion, and (iii) a power control module for controlling a power level of the LO signal, the method comprising steps of:
 transmitting a discovery message to the plurality of upstream coherent optical transceivers;
 receiving, in response to the step of transmitting, an upstream power level of the first upstream coherent optical transceiver; and
 dynamically controlling the LO power level according to the upstream power level received from the first upstream coherent transceiver.

13. The method of claim 12, wherein the downstream coherent optical transceiver comprises an optical line terminal (OLT), and the first upstream coherent optical transceiver comprises a first optical network unit (ONU).

14. The method of claim 13, wherein the step of dynamically controlling is based on a real-time feedforward tap, provided to the power control module from the optical transport medium, of an upstream burst signal from the first ONU.

15. The method of claim 13, wherein the OLT further includes a dynamic bandwidth allocation (DBA) unit in communication with the power control module, and wherein the method further comprises a step of adjusting the LO power level, based on MAP information from the DBA unit, for an upstream burst from the first ONU based on the grant.

16. The method of claim 12, wherein the step of dynamically controlling is based on a real-time feedback loop to the power control module of an electrical output signal from a photodetector of the receiver portion prior to amplification and processing.

17. The method of claim 12, further comprising, prior to the step of transmitting, a step of setting a plurality of different upstream power loss classes for the coherent PON, and wherein the step of transmitting comprises broadcasting the discovery message for a first loss class of the plurality of upstream power loss classes.

18. The method of claim 17, wherein the step of receiving comprises a match of a first ONU to a first loss class.

19. The method of claim 12, wherein the step of dynamically controlling comprises a substep of detecting an upstream burst from a first ONU based on a first loss class.

20. The method of claim 13, wherein the step of transmitting includes transmitting output power of the OLT to enable the first ONU to automatically adjust optical power of an upstream burst to the OLT according to a measurement of the transmit output power.

* * * * *